US006718543B2

United States Patent
Arai et al.

(10) Patent No.: US 6,718,543 B2
(45) Date of Patent: *Apr. 6, 2004

(54) METHOD AND APPARATUS FOR OPTIMIZATION OF THE PERFORMANCE OF AN APPLICATION PROGRAM IN A COMPUTER SYSTEM WHILE PRESERVING THE SYSTEM BEHAVIOR

(75) Inventors: Daniel T. Arai, Sunnyvale, CA (US); Jack Tihon, San Francisco, CA (US)

(73) Assignee: Hewlett-Packard Development Company, L.P., Houston, TX (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/435,665

(22) Filed: Nov. 8, 1999

(65) Prior Publication Data

US 2003/0115580 A1 Jun. 19, 2003

(51) Int. Cl.⁷ .............................. G06F 9/45; G06F 9/44
(52) U.S. Cl. ..................... 717/158; 717/164; 717/166
(58) Field of Search ..................... 717/151, 152–167, 717/140, 107, 114, 117; 709/200; 711/125; 712/227; 714/47

(56) References Cited

U.S. PATENT DOCUMENTS

| | | | |
|---|---|---|---|
| 5,727,147 A | 3/1998 | van Hoff | 709/200 |
| 5,901,314 A * | 5/1999 | Boehme et al. | 717/107 |
| 5,995,754 A * | 11/1999 | Holzle et al. | 717/158 |
| 6,072,951 A * | 6/2000 | Donovan et al. | 717/158 |
| 6,279,151 B1 * | 8/2001 | Breslau et al. | 717/140 |
| 6,295,644 B1 * | 9/2001 | Hsu et al. | 717/158 |
| 6,298,479 B1 * | 10/2001 | Chessin et al. | 717/164 |
| 6,317,870 B1 | 11/2001 | Mattson, Jr. | |

* cited by examiner

*Primary Examiner*—Anthony Nguyen-Ba

(57) ABSTRACT

The present invention relates to a mechanism for copying selected routines from shared libraries into application programs thereby generating optimized application programs for more rapid execution of the various applications within a computer system. Since optimized programs occupy space on disk and in RAM, programs are preferably selected for optimization based on their frequency of execution and the frequency with which calls are made to the shared libraries. Profile information may be used to identify the execution efficiency of the various application programs and thereby identify the best candidates for optimization. Further, profile information may be employed to copy individual routines contained within the libraries rather than having to copy an entire library where only one routine within the library was of interest. Pinpointing the individual routines of interest in this manner may help conserve disk space by copying only those routines which are most needed to optimize program execution performance.

21 Claims, 2 Drawing Sheets

METHOD AND APPARATUS FOR OPTIMIZATION OF THE PERFORMANCE OF AN APPLICATION PROGRAM IN A COMPUTER SYSTEM WHILE PRESERVING THE SYSTEM BEHAVIOR

TECHNICAL FIELD

The invention relates in general to computer software, and in particular to improving the efficiency of repeated execution of established program modules.

BACKGROUND

Application programs are generally built from software components comprising routines within libraries. These routines may be used and re-used as often as a particular application program requires. The program modules may be stored separately from the application program in shared libraries or in archive libraries within the application program.

Shared libraries generally contain routines which may be potentially be accessed by a number of different application programs. The routines are generally sufficiently modular that they may be used with a range of different application programs and operate compatibly with all of them. Examples of such program modules include sine and cosine functions among other standard mathematical operations usable by a variety of application programs.

Shared libraries offer the advantage of occupying less disk space and using less RAM at run-time than if the various libraries were initially included in the various main application programs. Further, program modules in shared libraries may be updated and improved independently of the application programs which make calls to the shared libraries. In this manner, the operation of programs calling the updated routines may be improved without changing the calling program.

The application programs and the various libraries are generally compiled separately. In order for the application programs to call the libraries or routines contained therein at run-time, link tables are established in both the application programs and the libraries. Generally, compilation of the shared library routines generate relocatable files. For the routine to be executed at run-time, a link table in the calling program or application program must be filled with information indicating the actual memory location of the desired library or routine. Generally, any call to a shared library routine involves loading the routine's address from the linkage table and branching to this address, which is generally time consuming. Accordingly, routines in shared libraries generally execute more slowly than equivalent routines initially incorporated into the application program. In addition to the link table requirements, compile time optimizations between the main application program code and the shared library routine code are generally not available since the routines are compiled separately. This unavailability of compile time optimizations tends to add the execution speed disadvantage of shared library routines.

Another way to store commonly used program modules is to link them directly with the application program. Routines stored in an archive library of an application program are generally combined with the application program thereby forming a single self-contained program. Employing a single program with all routines included generally provides the application program with all required address information for the archived routines thereby obviating the need for the creation of linking tables and the need to load addresses from this table for each library routine call. Generally, a further benefit arises from the availability of compile time optimizations when using libraries archived within the application program which are generally not available when the archive libraries and application program are located in independent files and are compiled independently.

Application programs with archived libraries therefore generally execute more rapidly than an application which makes calls to shared libraries. Archive libraries however, generally occupy more disk space than shared libraries since each library will generally be stored along with each application program which places the library in its archive. Programs with archive libraries also generally require more RAM at run-time than programs employing shared libraries. Furthermore, shared libraries generally present the benefit of modularity. Specifically, shared libraries may be updated independently of the application programs which call them. In order to update a library archived within an application program, the entire program would generally have to be relinked with the new library. Accordingly, in the prior art, the user is presented with a choice between a modular shared routine which takes up little disk space but executes slowly and an archived routine which takes up more disk space but executes rapidly.

Therefore, there is a need in the art for re-usable library routines to execute rapidly while minimizing the demands on disk space and RAM memory during run-time.

SUMMARY OF THE INVENTION

These and other objects, features and technical advantages are achieved by a system and method which copies selected shared library routines into an original application program to create a new executable, in the form of an optimized application program, thereby providing for more rapid execution of the combination of original application code and the copied shared library routines. Preferably, system behavior with respect to the shared libraries is preserved when employing the present invention. Where several versions of a shared library exist on a computer system and a particular application program requires one specific version among the several versions, an application program optimized according to the mechanism of the present invention preferably selects the same specific version of the shared library as the original unoptimized version.

In a preferred embodiment, the inventive system and method preferably preserve an original version of the application program. The inventive system and method may then determine, based on the needs of a particular application, whether the new or original application program is best suited for the task. If a task does not require the incorporated shared library routines, the original application program will preferably be employed. Where a task requires one or more library routines which have been copied into an optimized program, the optimized application program will be employed.

As used herein, the term "incorporating" refers to a process of copying a shared library or a routine within a shared library into an original application program and re-linking the combination of the original application program code and the copied shared library code to produce a new executable to be known as an optimized version of that application program. The term "code of interest" applies to code in the shared libraries which is a candidate for being copied or incorporated into a calling application program because such code satisfies one or more factors favoring such incorporation.

Preferably, various different application programs may be optimized, enabling various different optimized application programs, corresponding to different original application programs, to co-exist on the system at any one time. Further, a single original application program may be optimized differently by copying different selections of shared libraries or shared library routines along with the original application program code, thereby enabling a number of different optimized versions of the same original application program to co-exist in the system at any one time. Although different versions of an optimized program may co-exist within an overall computer system, where two optimized programs differ only in the respect that one of the programs has more recent versions of certain library routines copied, the program with the outdated libraries will preferably be deleted in order to preserve disk space on the system.

Generally, while copying shared library routines into application programs causes the routines to execute more rapidly, such copying also generally occupies more disk space and more RAM at run-time. Copying no routines at all would generally present no burden on RAM and disk space but would also generally cause no improvement in execution speed. On the other hand, copying an excessive number of shared library routines would generally require an unacceptable amount of disk space and RAM. Accordingly, the present invention is selective with respect to the routines which are copied into application programs so as to balance the objectives of rapid execution and efficient utilization of RAM and disk space.

As used herein, the term "system" generally refers to an overall computer system optionally including both hardware and software. The terms "application" or "task" refer to an operation to be performed by the system. The term "application program" refers to a specific block of code which may be employed to perform a required function within the system. It is noted that, at any one time, there may be more than one application program capable of performing a function or operation required by the system. The term "application program" generally refers to an original application program which generally does not have archived libraries and functions by making calls to shared libraries. The term "optimized application programs" refers to original application programs into which code from shared libraries or shared library routines have been copied so as to achieve superior performance.

In a preferred embodiment, a number of different optimized application programs with different sets of routines taken from previously shared libraries, and now copied into executable application programs, will be available for execution depending on the needs of a particular application or task. The inventive mechanism preferably logs the different application programs and the routines archived within them so as to select the application program best suited for a particular task.

Generally, executing shared library routines requires that the computer system executing the application program fill linkage tables with address information for both executable code and data used by the program. The process of supplying data to the linking tables is generally necessary each time a shared library routine is loaded for execution by the computer system. Each call to a shared library routine involves loading the address of the routine from the linkage table and transferring control to this address. However, once a shared library routine is copied into an application program, the address locations for the code within the copied routine are known, and program execution is not burdened with the need to look up the addresses of shared library routines in order to call them. Although address locations for executable code in a copied routine are generally known, address information for data to be accessed by the copied routine or library may still have to be looked up at run-time.

In an alternative embodiment, rather than copying shared library routines so as to resolve the addresses of executable code but not those of data tables, the application program could be relinked with the archive versions of the libraries it uses. Linking with the archive libraries preferably enables all required address information (that is, for data tables as well as executable code) to be supplied to the link tables. Preferably such fully archived routines operate just as they would if the code for the routine had been present in the application program when the application program was first compiled.

In a preferred embodiment, the computer system may select from among several optimized application programs which have varying sets of routines copied into them. Preferably, the libraries and/or routines required for a task are compared with those routines which have been copied into various optimized application programs to ensure a proper match. If the versions of routines needed by a task do not match those which have been copied into existing optimized programs, the system may choose to load the unoptimized application program and call the appropriate shared libraries. Alternatively, the system may copy the desired routines into the application program thereby creating a new optimized application program if circumstances otherwise warrant copying of the desired routines.

In a preferred embodiment, the inventive system and method includes a mechanism for identifying those shared library routines which are preferred candidates for being copied into an optimized application program. Factors which may be used to identify such preferred candidates include but are not limited to: the frequency of execution of the routine, the time required for execution of the shared routine, the time required for execution of the routine once archived, and an estimated improvement in overall application program efficiency resulting from copying of each routine. The inventive system and method preferably have the ability to incorporate additional shared library routines as a need for such incorporation becomes apparent.

In a preferred embodiment, the inventive system and method includes a mechanism for identifying application programs which are preferred candidates for optimization. Factors which may be used to identify such preferred candidates include but are not limited to: execution efficiency of the original application program, frequency of execution of the application program, frequency of calls to shared library routines, and the total amount of time devoted to the application program by the computer system.

In a preferred embodiment, an optimizer is employed which is capable of performing optimizations other than copying shared libraries into original application programs. Additional possible optimizations include code layout and hot-cold optimizations. Preferably, optimizations are performed during computer system idle time to as to minimize any interference with application programs. Preferably, the various optimizations all contribute to enabling the optimized programs to execute as rapidly as possible while minimizing the burden on disk space and RAM.

Therefore, it is an advantage of the present invention that optimized programs execute more rapidly than original application programs.

It is a further advantage of the present invention that shared library routines may be screened for copying into application programs to avoid excessive consumption of disk space and RAM at run-time.

It is a still further advantage of the present invention that application programs may be screened for factors favoring selection for optimization thereby improving execution speed while avoiding placing excessive demands on RAM and disk space.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWING

For a more complete understanding of the present invention, and the advantages thereof, reference is now made to the following descriptions taken in conjunction with the accompanying drawing, in which.

DETAILED DESCRIPTION

Figure 1:
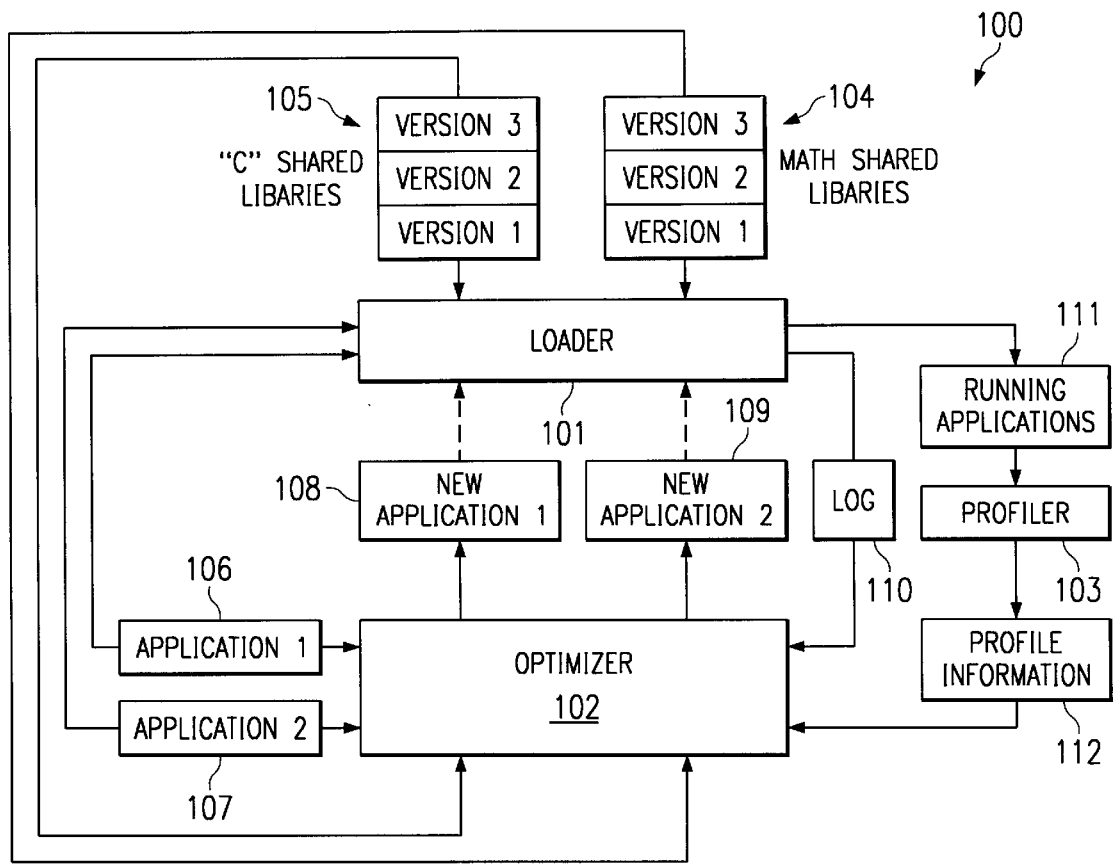
FIG. 1 depicts the operation of the inventive mechanism according to a preferred embodiment of the present invention.

FIG. 1 depicts the operation of the inventive mechanism according to a preferred embodiment of the present invention. In a preferred embodiment, a set of application programs 111 is active within computer system 100. These application programs may employ calls to shared libraries to perform certain standardized operations such as mathematical routines or other commonly used routines such as windowing interface operations, printing text, and opening files on disk. Depending upon system requirements, some programs may be executed more frequently than others. The various application programs 111 may employ shared libraries with varying degrees of frequency.

In a preferred embodiment, the profiler 103 keeps track of the overall execution efficiency of the various application programs 111, which shared libraries are being used by the running application programs 111, and how frequently each of the shared libraries is called by each of the application programs, and preferably stores such information 112 so that it is accessible to other operating components of the computer system, such as optimizer 102 and loader 101. The loader 101 is preferably able to supply a subset of the above information where the profiler 103 is omitted from system 100. Specifically, the loader 101 may supply information including the frequency of execution of application programs.

In a preferred embodiment, the optimizer 102 employs the profile information 112 to identify preferred candidates for optimization among the various application programs. Generally, each application program will employ calls to shared library routines for selected specialized functions such as mathematical functions. Examples of such shared libraries are the Math shared libraries 104 and the "C" shared libraries 105. For each application program selected for optimization, the optimizer 102 selects shared libraries or shared library routines to be copied into the application program to be optimized.

In a preferred embodiment, the optimizer 102 optimizes only application programs which satisfy a selected set of factors. Such selectivity is advantageous for overall system operation because the creation of optimized programs occupies valuable disk space. By efficiently selecting application programs for optimization, the benefits of both shared libraries and libraries copied into optimized programs may co-exist in the inventive system. The system may experience the enhanced computational performance of copied libraries where application programs have been optimized, yet may retain the reduced disk space and RAM usage of employing shared libraries for application programs not warranting optimization. The system may also provide applications with the ability to use routines from upgraded shared libraries.

In a preferred embodiment, for each application program selected for optimization, the optimizer copies the selected shared libraries or shared library routines into the application program and performs the required linking between the programs by resolving address cross-references between the application programs and the shared library routines. Preferably, loads from the linkage table and subsequent indirect calls may be replaced by direct calls. The optimizer thereby generates a new binary version of the selected program, or optimized application program. Thereafter, the optimized program preferably makes calls to the incorporated library routines thereby enabling the optimized program to run more rapidly and more efficiently than the original application program.

In a preferred embodiment, two or more factors describe the operation of copying a shared library into an optimized application program. One factor is the extent of copying which describes the number of routines from a particular shared library which are copied into an optimized program. A second factor is the degree of linking between the shared library routines and the application program. Generally, many, but not all, table lookups are removed from the routines once they are copied into an optimized program. Certain lookups, such as for the addresses of shared library data, may remain, thereby requiring that execution time be expended at run-time to resolve references to addresses of such data in the copied routines.

In a preferred embodiment, a copy of the original program is preserved even though an optimized version of the program is generated. Furthermore, different optimized versions of a particular application program may co-exist within system 100. Similarly, different versions of shared libraries may co-exist in system 100. Because of updates to the shared library routines and the addition of new shared library routines, it is possible for different versions of a shared library to exist within the system. Furthermore, it is possible that versions of routines in the shared libraries differ from versions which have been copied into optimized programs.

In a preferred embodiment, an enhanced loader 101 enables the system 100 to ensure that versions of the routines desired by a task or application are the ones which are in fact executed. Accordingly, the loader 101 preferably keeps track of which versions of various routines have been copied into the various optimized programs. Therefore, when an application or task requires an application program and suitable versions of shared library routines are specified, the loader 101 preferably checks for correspondence between the versions of routines desired by the application and the versions of the routines available in the optimized programs. Where the versions match, the optimized program will be loaded. Where the versions do not match, the loader 101 preferably loads an original application program which will make ordinary shared library calls in order to access the suitable versions of the required routines.

In a preferred embodiment, optimizer 102 employs profile information 112 to identify application programs which are preferred candidates for optimization, and for application programs selected for optimization, which shared libraries are preferred candidates for being copied into the selected application programs. The optimizer 102 preferably logs the various optimized application programs and which library routines have been copied into each of the programs in log or repository 110.

In the example of FIG. 1, application program 1 106 and application program 2 107 are selected for optimization by optimizer 102. The optimizer 102 preferably selects the math shared libraries 104 and the "C" shared libraries 105 for copying into application programs 106 and 107. The optimizer 102 preferably proceeds to thereby create optimized applications 1 108 and 2 109. In alternative embodiments, the optimizer could select different application programs for optimization, and could select a different set of shared libraries to be archived in each of the selected application programs. Furthermore, depending upon the available profile information 112, the optimizer could select a subset of routines from a particular library for copying into an application program, and all such variations are included in the scope of the present invention.

In a preferred embodiment, the loader 101 loads applications necessary to service the requirements of system 100. Upon determining which functions are required by system 100, the loader 101 preferably proceeds to decide which application programs and which shared libraries are required to perform the pertinent functions. The loader preferably checks the log or repository 110 to determine whether optimized programs are available which can perform the required functions and whether the libraries archived in these optimized programs match the shared libraries requested for loading. Where optimized programs exist which have the same versions of the required libraries as those requested for loading, the loader 101 will generally load the optimized programs. If the routines have been superseded by new shared library routines, or if the shared library versions do not match, the loader 101 preferably loads an unoptimized application program that will employ ordinary shared library calls.

In a preferred embodiment, information which is useful in determining which application programs to optimize and which shared library routines to copy into the optimized programs may be supplied by the loader 101 and/or the profiler 103. Generally, the profiler 103 provides information relating to factors including but not limited to: the execution efficiency of application programs, the number of calls to shared libraries by an application program and the locations of these calls, the frequency with which a particular shared library routine is called by a particular application program, and estimates of execution speed and efficiency improvement resulting from an optimization. Generally, the loader 101 provides information including but not limited to: the frequency of execution of each application program within system 100 and the frequency with which particular application programs are loaded with particular shared libraries.

In a preferred embodiment, where optimized programs contain copies of shared libraries or routines which have been superseded by updated versions of corresponding shared libraries, the system may delete such optimized programs to preserve valuable disk space. The system may then load an original application program which makes required calls to shared libraries or may generate an updated optimized program by copying the latest versions of shared libraries into the optimized programs.

Figure 2:
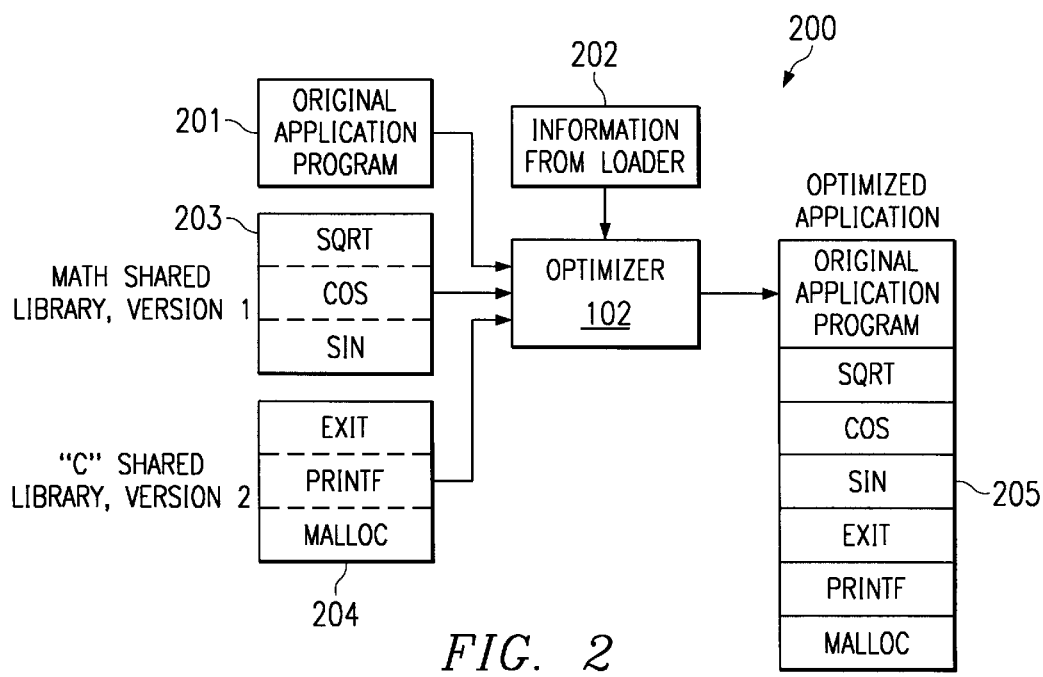
FIG. 2 depicts an example of the operation of a basic optimizing process according to a preferred embodiment of the present invention.

FIG. 2 depicts an example of the operation of a basic optimizing process according to a preferred embodiment of the present invention. In the example of FIG. 2, optimization is performed without the benefit of profile information 112 (FIG. 1). In the example of FIG. 2, the initial executable components are the original application 201, the math shared library 203, and the "C" shared library 204. Preferably, information from the loader 202 may be used in conjunction with the optimizer 102 to produce optimized application program 205.

In a preferred embodiment, the information from the loader 202 supplies the optimizer 102 with information indicating which libraries are most frequently used by original application program 201. Advantageously employing this information, the optimizer 102 copies the contents of the shared libraries 203 and 204 into original application program 201 to produce optimized program 205. Generally, without profile information, the loader is limited to incorporating entire libraries at a time, such as libraries 203 and 204, rather than being able to select individual routines for incorporation into original application program 201, as there is generally no way of knowing which routines are used most frequently when information 202 from the loader alone is available to the optimizer 102.

Figure 3:
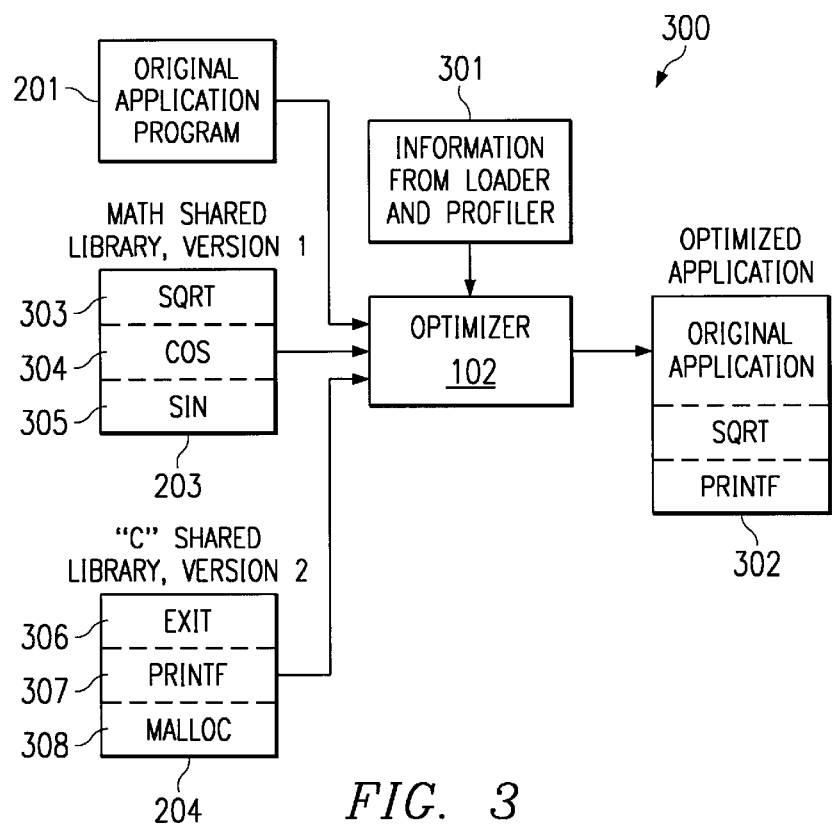
FIG. 3 depicts an example of the operation of an optimizer with profile information according to a preferred embodiment of the present invention.

FIG. 3 depicts an example of the operation of an optimizer 102 with profile information according to a preferred embodiment of the present invention. In this embodiment, the optimizer is preferably able to employ information 301 from both the loader and optimizer in order to produce optimized application program 302.

In a preferred embodiment, the combined information 301 from the loader and profiler enables the optimizer 102 to determine not only which shared libraries are most frequently used by an application program but also which routines within each library are most frequently used. Greater efficiency may thereby be obtained by archiving only those routines which most improve the execution efficiency of the application program 201, rather than having to copy an entire library of routines in order to acquire the routines which are most beneficial.

In the example portrayed in FIG. 3, the optimizer 102 has access to the information 301 from the loader and compiler, the original application program 201, math shared library 203, and "C" shared library 204. Math shared library 203 preferably includes "Sqrt" routine 303, "Cos" routine 304, and "Sin" routine 305. "C" shared library 204 preferably includes "Exit" routine 306, "Printf" routine 307, and "Malloc" routine 308. Preferably, the various routines within shared libraries 203 and 204 are independently accessible by optimizer 102. The specific routines identified above are for exemplary purposes. A variety of routines may be employed and may be distributed among a variety of different libraries, and all such variations are included within the scope of the invention.

In a preferred embodiment, the information 301 from the loader and profiler identifies for the optimizer 102, which routines among the shared libraries 203 and 204 are most frequently executed by original application program 201. The optimizer 102 then preferably copies the routines identified in information 301 with original application program 201 thereby forming optimized application program 302. In the specific example of FIG. 3, the selected routines are the "Sqrt" routine 303 from the math shared library 203 and the "Printf" routine 307 from the "C" shared library 204. However, any set of routines from the depicted libraries could have been selected for inclusion in optimized application program 302 depending upon the information 301 provided to the optimizer 102.

While in the example of FIG. 2, all routines from the frequently accessed libraries 203 and 204 were included in optimized program 205, in the example of FIG. 3, optimized program 302 includes only the routines within libraries 203 and 204 which were most frequently accessed. Optimized program 302 is thereby preferably provided with the benefit of having copied versions of the frequently accessed routines while occupying less disk space and employing less RAM at run-time than optimized program 205 (FIG. 2). Therefore, the addition of profile information to the loader information 202 (FIG. 2) preferably enables more efficient optimization of original application program 201 with less required RAM and disk space than was available without profile information.

Figure 4:
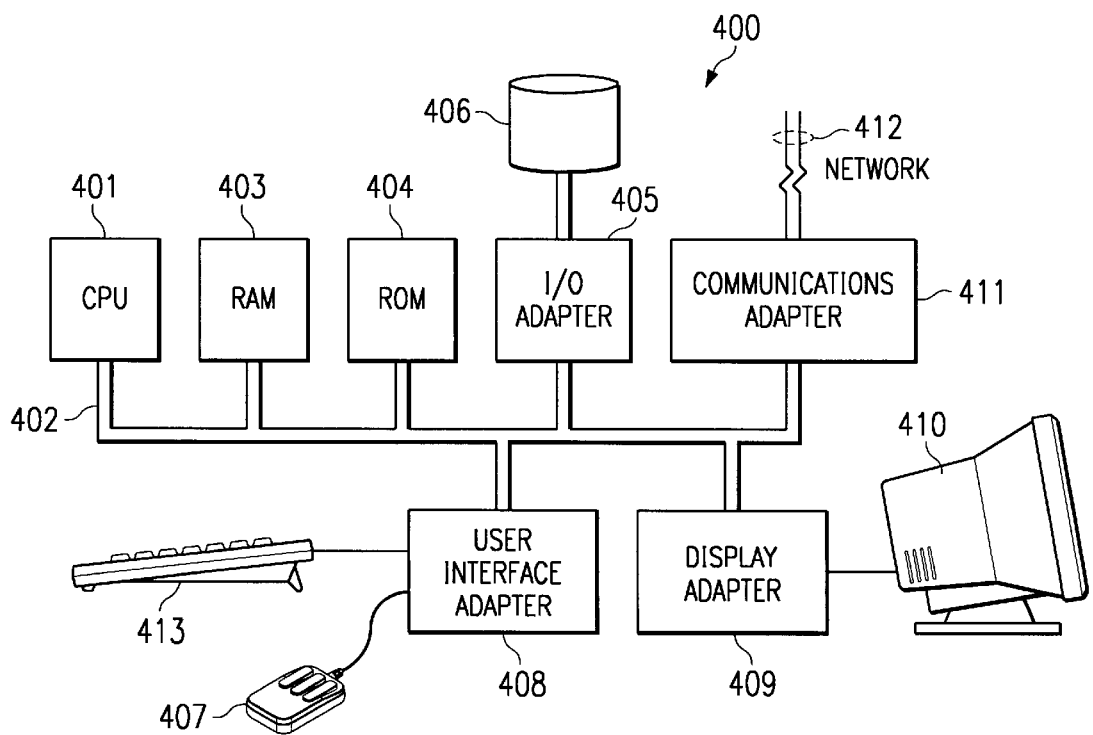
FIG. 4 depicts a computer system 400 adapted to use the present invention.

FIG. 4 illustrates computer system 400 adapted to use the present invention. Central processing unit (CPU) 401 is coupled to system bus 402. The CPU 401 may be any general purpose CPU, such as an HP PA-8200. However, the present invention is not restricted by the architecture of CPU 401 as long as CPU 401 supports the inventive operations as described herein. Bus 402 is coupled to random access memory (RAM) 403, which may be SRAM, DRAM, or SDRAM. ROM 404 is also coupled to bus 402, which may be PROM, EPROM, or EEPROM. RAM 403 and ROM 404 hold user and system data and programs as is well known in the art.

The bus 402 is also coupled to input/output (I/O) adapter 405, communications adapter card 411, user interface adapter 408, and display adapter 409. The I/O adapter 405 connects to storage devices 406, such as one or more of hard drive, CD drive, floppy disk drive, tape drive, to the computer system. Communications adapter 411 is adapted to couple the computer system 400 to a network 412, which may be one or more of local (LAN), wide-area (WAN), Ethernet or Internet network. User interface adapter 408 couples user input devices, such as keyboard 413 and pointing device 407, to the computer system 400. The display adapter 409 is driven by CPU 401 to control the display on display device 410.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for optimizing the performance of an application program in a computer system having code modules independent of the application program and accessed by the application program, the method comprising the steps of:

selecting the application program for optimization based on at least one of a frequency of execution of said application program, an efficiency of execution of said application program, and a number of calls to said independent code modules in said application program;

identifying code of interest in said independent code modules, thereby establishing accessed code of interest;

incorporating said accessed code of interest into the application program thereby generating an optimized application program having rapidly executable incorporated accessed code;

determining whether to execute the application program or the optimized application program; and wherein the application program in combination with said code modules generates a system behavior, preserving said system behavior with said optimized application program having incorporated accessed code.

2. The method of claim 1, wherein the accessed code is a shared library within said computer system.

3. The method of claim 1, wherein the accessed code is a routine included in a shared library within said computer system.

4. The method of claim 1, wherein the computer system includes a plurality of application programs.

5. The method of claim 1, wherein the code of interest is code which is frequently called by said application program.

6. The method of claim 1 further comprising:

identifying other code of interest in said independent modules, thereby establishing other accessed code of interest;

incorporating said other code of interest into the application program thereby generating another optimized version of the application program.

7. The method of claim 6 wherein said determining comprises determining whether to initially employ the application program, the optimized application program, or the another optimized version of the application program.

8. A system for optimizing the performance of an application program in a computer system having code modules independent of the application program and accessed by the application program, the system comprising:

an optimizer for identifying code of interest in said independent code modules, thereby establishing accessed code of interest, as well as for incorporating said accessed code of interest into the application program thereby generating an optimized application program having rapidly executable incorporated accessed code, wherein the application program is selected for optimization based on at least one of a frequency of execution of said application program, an efficiency of execution of said application program, and a number of calls to said independent code modules in said application program; and a program loader for determining whether to execute the application program or the optimized application program;

wherein the application program in combination with said code modules generates a system behavior, and the system behavior is preserved with said optimized application program having incorporated accessed code.

9. The system of claim 8, wherein the accessed code is a shared library within said computer system.

10. The system of claim 8, wherein the accessed code is a routine included in a shared library within said computer system.

11. The system of claim 8, wherein system behavior established by the application program in combination with said code modules is preserved when executing said optimized application program having incorporated accessed code.

12. The system of claim 8, wherein:

the computer system includes a plurality of application programs.

13. The system of claim 8, wherein the code of interest is code which is frequently called by said application program.

14. The system of claim 8 wherein said optimizer is further operable to identify other code of interest in said independent code modules, thereby establishing other accessed code of interest, as well as incorporate said other accessed code of interest into the application program thereby generating another optimized version of the application program.

15. The system of claim 14 wherein said program loader is further operable to determine whether to initially employ the application program, the optimized application program, or the another optimized version of the application program.

16. A computer program product having a computer readable medium having computer program logic recorded thereon for optimizing the performance of an application program in a computer system having code modules independent of the application program and accessed by the application program, the computer program product comprising:

code for selecting the application program for optimization based on at least one of a frequency of execution of said application program, an efficiency of execution of said application program, and a number of calls to said independent code modules in said application program;

code for identifying code of interest in said independent code modules, thereby establishing accessed code of interest;

code for incorporating said accessed code of interest into the application program thereby generating an optimized application program having rapidly executable incorporated accessed code; and code for determining whether to execute the application program or the optimized application program;

wherein the application program in combination with said code modules generates a system behavior, and the computer program product preserves said system behavior with said optimized application program having incorporated accessed code.

17. The computer program product of claim 16, wherein the accessed code is a shared library within said computer system.

18. The computer program product of claim 16, wherein the accessed code is a routine included in a shared library within said computer system.

19. The computer program product of claim 16, wherein system behavior established by the application program in combination with said code modules is preserved when executing said optimized application program having incorporated accessed code.

20. The computer program product of claim 16 wherein said code for identifying comprises code for identifying other code of interest in said independent code modules, thereby establishing other accessed code of interest; and wherein said code for incorporating further comprises code for incorporating said other accessed code of interest into the application program thereby generating another optimized version of the application program.

21. The computer program product of claim 16 wherein said code for determining further comprises code for determining whether to initially employ the application program, the optimized application program, or the another optimized version of the application program.

* * * * *